United States Patent
Bach et al.

[11] 3,712,177
[45] Jan. 23, 1973

[54] HYDRAULIC BRAKE BOOSTER WITH DISC REACTION

[75] Inventors: Lloyd G. Bach; Jerome T. Ewald, both of South Bend, Ind.

[73] Assignee: The Bendix Corporation

[22] Filed: Sept. 21, 1970

[21] Appl. No.: 73,934

[52] U.S. Cl..................91/369 A, 91/373, 91/376
[51] Int. Cl..............................................F15b 9/10
[58] Field of Search......91/369 R, 369 A, 369 B, 434, 91/376, 320, 321, 322, 323

[56] References Cited

UNITED STATES PATENTS 3,074,383   1/1963   Schultz..................................91/434
3,110,031   11/1963  Price ...................................91/369 A Primary Examiner—Paul E. Maslousky
Attorney—Ken C. Decker and Plante, Hartz, Smith and Thompson

[57] ABSTRACT

A hydraulic brake booster is disclosed which includes a housing in fluid communication with a fluid pressure source and with a reservoir. A piston is slidably mounted in the housing, and valve means are provided to selectively admit fluid from the fluid pressure source to one side of the piston for shifting the latter within the housing to apply the brakes of the vehicle. Operator-actuated means are provided for controlling the valve means. Movement of the piston within the housing progressively pressurizes a deformable rubber member disposed adjacent one end of the piston. A plunger is provided that senses a proportional amount of the pressurization of the deformable member and transmits a corresponding force to the operator-actuated means, opposing movement of the latter, to thereby provide braking "feel" to the vehicle operator.

7 Claims, 2 Drawing Figures

PATENTED JAN 23 1973　3,712,177

INVENTOR.
LLOYD G. BACH
JEROME T. EWALD
BY
ATTORNEY 3,712,177

HYDRAULIC BRAKE BOOSTER WITH DISC REACTION

BACKGROUND OF THE INVENTION

This invention relates to a hydraulic brake booster having a resilient reaction producing device.

In vehicles having power-assisted brakes, the operator-actuated input rod must be reisted by a proper proportion of the brake-applying force generated by the booster to provide a proper brake "feel" to the vehicle operator. Many existing vacuum-assisted power braking units use the rubber disc reaction device disclosed in U.S. Pat. No. 3,110,031, owned by the assignee of the present invention and incorporated herein by reference. The device disclosed in the aforementioned patent provides almost no reaction force to the vehicle operator until an applying force sufficient to overcome the force of the brake return springs is applied to the input control rod. However, once this force level has been achieved, the reaction force resisting movement of the control rod is in direct proportion to the force applied to the control rod by the vehicle operator. Although vacuum-assisted power brake units of the type disclosed in the aforementioned patent have been quite successful, they are expected to be replaced in the near future by hydraulically assisted brake boosters of the type, for example, disclosed in U. S. Pat. application No. 793,923, filed Jan. 16, 1969, and owned by the assignee of the present invention. The reaction producing means used in existing hydraulic brake boosters provides a reactive force that is directly proportional to the fluid pressure used in the booster. However, it is desirable that hydraulic brake boosters provide reaction forces similar to those provided in the existing vacuum boosters.

SUMMARY OF THE INVENTION

Therefore, an important object of my invention is to provide a hydraulic brake booster having a brake "feel" similar to that provided in existing vacuum brake boosters.

Another important object of my invention is to provide a rubber reaction device for a hydraulic brake booster similar to the reaction device used in existing vacuum boosters.

Another important object of my invention is to provide a brake booster having both hydraulic and mechanical reaction.

DETAILED DESCRIPTION

Figure 1:
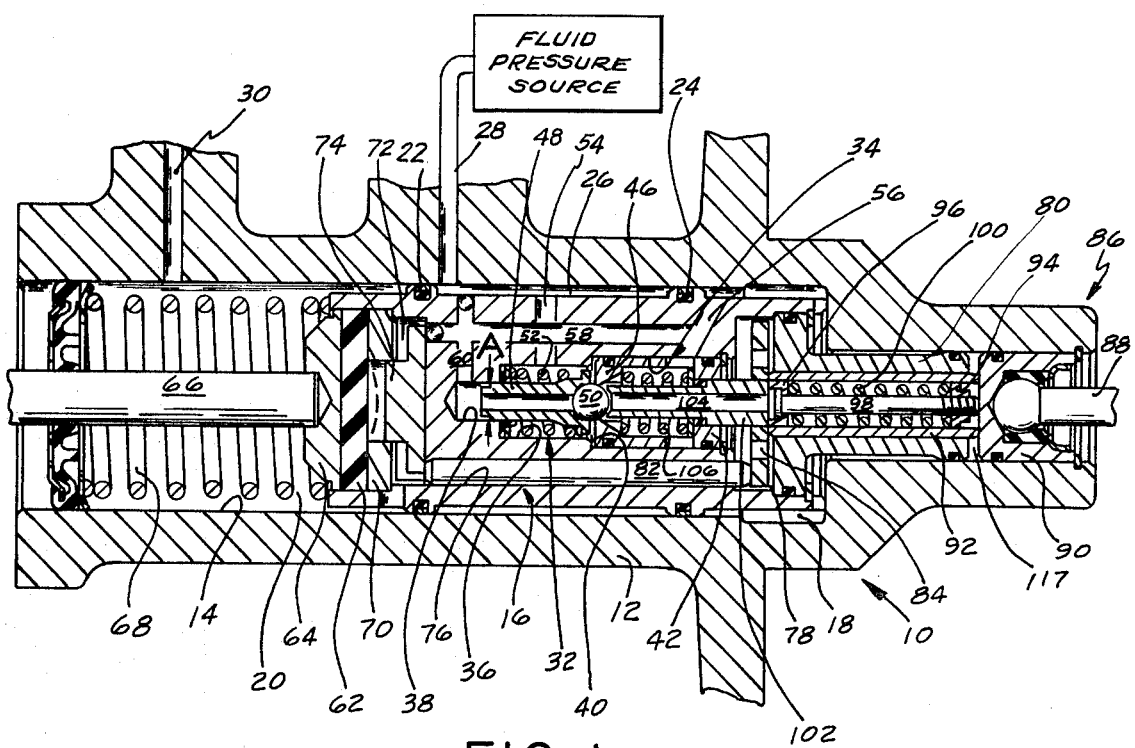
FIG. 1 is a cross sectional view of a brake booster made pursuant to the teaching of my present invention.

Referring now to the drawings, a brake booster 10 includes a housing 12 defining a bore 14 therewithin. A piston 16 is shiftable in bore 14 and divides the latter into first and second chambers 18 and 20, respectively. A pair of annular seals 22, 24 seal the piston 16 against the wall of the bore 14. That portion of the outer circumferential surface of the piston 16 between the seals 22 and 24 is recessed from the wall of the bore 14 to define an annular chamber 26 therebetween. An inlet port 28 communicates the chamber 26 with a fluid pressure source (not shown). An outlet port 30 communicates the chamber 20 with a fluid reservoir (not shown).

An elongated compartment 32 is provided within the piston 16. The compartment 32 includes a larger diameter portion 34, an intermediate diameter portion 32, and a smaller diameter portion 38. A shoulder 40 is defined between the portion 36 and 38, and an annular plug 42 closes the end of the larger diameter portion 34. A valve seat 46 is maintained in engagement with the shoulder 40. One end of a plunger 48 is slidably received in the smaller diameter portion 38, and a spherical valve member 50 is supported on the other end of the plunger 48. A spring 52 yieldably urges the ball member 50 against the valve seat 46 to prevent fluid communication between the portions 36 and 34 of the compartment 32. A fluid passage 54 communicates the chamber 26 with the portion 36. Another passage 56 communicates the larger portion 34 with the chamber 18. The smaller portion 38 is also communicated to the chamber 18 by passages 58 and 60.

A rubber reaction member 62 and its backing member 64 are slidably supported in the chamber 20 by the end of the piston 16. A rod 66 interconnects the supporting member 64 with a standard automotive master cylinder (not shown) mounted to the left of the booster housing 12 (viewing the Figures). A return spring 68 yieldably urges the piston 16 toward the right viewing FIG. 1, toward the brake release position. The end of the piston 16 adjacent to the reaction disc 62 is dished to present an annular rim 70 engaging the outer peripheral portion of the disc 62 and a recess 72 in which a reaction plunger 74 is slidably disposed for sensing pressurization of the disc 62. A plurality of circumferentially spaced bores 76 communicate the recess 72 with another compartment 78 at the other end of the piston 16. The compartment 78 is defined between the annular plug 42 and an annular closure member 80. Pins 82 extend through each of the bores 76 and transmit forces between the reaction plunger 74 and a reaction washer 84 which is slidably mounted in the compartment 78.

Actuation of the booster 10 is accomplished by the operator-actuated means generally indicated at 86. Operator-actuated means 86 includes a rod 88, one end of which is connected to the usual brake pedal (not shown), which is mounted in the operator's compartment. The other end of the rod 88 is received in a socket 90 which is slidably mounted within the housing 12. One end of a sleeve 92 which is slidably mounted within the annular closure member 80 engages the end of the socket 90. The other end of the sleeve 92 engages the reaction washer 84. A pair of washers 94, 96 are slidably mounted within the sleeve 92. A bolt 98 is threadably connected to the washer 94 and projects through the other washer 96. A spring 100 yieldably urges the washer 96 against the head on the end of the bolt 98. A valve operating member 102 is slidably mounted in the annular plug 42 and extends through the reaction washer 84. One end of the valve operating member 102 is adapted to engage the sphere 50 for forcing the latter from the valve seat 46 when the brake is actuated, and the other end of the member 102 abuttingly engages the washer 96. Valve operating member 102 defines a passage 104 therewithin which normally communicates the large diameter portion 34 of the compartment 32 with the compartment 78 when the brakes of the vehicle are released. A spring 106 yieldably urges the member 102 to the right viewing FIG. 1, that is, toward the brake release position.

MODE OF OPERATION

FIG. 1 illustrates the relative positions of the various components of the brake booster 10 when the brakes of the vehicle are released. In this position, the chamber 18 is vented to the outlet 30 through the passages 56 and 104, the chamber 78, the passages 76 and the chamber 20. Fluid at a relatively high pressure is communicated into the portion 36 of the compartment 32 through the inlet port 28, the annular chamber 26, and the passage 54. When the vehicle operator effects a brake application, the input rod 88 is moved to the left viewing FIG. 1. Since the spring 100 is sufficiently strong to maintain the washer 96 in engagement with the head of the bolt 98, movement of the rod 88 to the left also moves the sleeve 92, washer 84, and valve operating member 102 to the left. The end of the valve operating member 102 first engages the sphere 50, thereby terminating fluid communication between the chambers 18 and 20 by closing the passage 104. Further movement of the valve operating member to the left, viewing FIG. 1, forces the sphere 50 from the seat 46, thereby permitting flow of high pressure fluid between the portion 36 and 34 of the compartment 32. This high pressure fluid is communicated into the chamber 18 through the passage 56. The high pressure fluid in chamber 18 acts on the end of the piston 16 to urge the latter to the left viewing FIG. 1. Movement of the piston 16 is transmitted to the aforementioned master cylinder by the rod 66, to apply the brakes of the vehicle. As the piston 16 shifts to the left, the rim 64 progressively pressurizes the outer annular portion of the reaction disc 62 as the piston 16 and disc 62 move to the left viewing FIG. 1. Pressurization of the outer annular portion of the disc 62 causes the central portion of the disc 62 to assume the position illustrated by the dotted lines in FIG. 1. This bulge in the central portion of disc 62 applies a force on the reaction plunger 74 which is transmitted to the rod 88 by the pins 82, reaction washer 84, sleeve 92, and socket 90. Since the disc 62 is progressively pressurized by the piston 16, as the latter moves to the left, the reaction force received at the rod 88 will be proportional to this pressurization.

Figure 2:
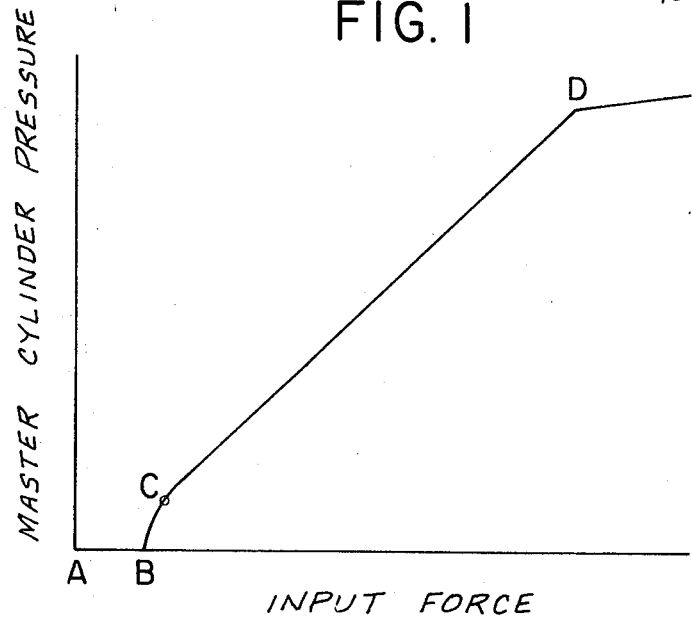
FIG. 2 is a visual representation of the relationship between the input force on the brake pedal to the reaction force provided on the booster input rod.

During a brake application, the high pressure fluid in the chamber 18 is also communicated to the smaller diameter portion 38 of the compartment 32 through the fluid passages 58 and 60. The fluid in the smaller portion 38 acts on the end of the plunger 48 and on the sphere 50, thereby urging the plunger 48 and sphere 50 to the right viewing FIG. 1. Fluid pressure in section 34 of compartment 32 also acts on the laterally extending surfaces of member 102. These combined forces are transmitted to the rod 88 through the valve operating member 102, washer 96, and socket 90 to provide a hydraulic reaction force on the input rod 88. Since the piston 16 must move a relatively short distance before the disc 62 is pressurized a sufficient amount to create a reaction force, the hydraulic reaction force transmitted through the plunger 48 and sphere 50 and the force of the springs 52 and 106 are the only forces felt by the vehicle operator when the brakes of the vehicle are applied lightly. Line A-B in FIG. 2 represents the force necessary to overcome the force of springs 52 and 106. Line B-C in FIG. 2 represents the hydraulic reaction force exerted upon the rod 88. As the piston 16 moves further to the left, viewing FIG. 1, thereby progressively pressurizing the disc 62, the mechanical reaction force transmitted to the plunger 88 through the pins 82 and reaction washer 84 is supplemented by the hydraulic reaction force transmitted through the plunger 48, sphere 50 and member 102. This force is represented by line C-D in FIG. 2.

When the force due to fluid pressure in the portion 38 of compartment 32 acting on the plunger 40, the sphere 50 and the rod 102 exceeds the force exerted by the spring 100, the plunger 48 and sphere 50 move to the right viewing FIG. 1, thereby driving the washer 96 away from the head of the bolt 98 and compressing the spring 100. When this occurs the sphere 50 again engages the seat 46 to terminate fluid communication from the pressure source into the chamber 18. This feature assures that the boost pressure in the chamber 28 can never exceed a maximum predetermined level. This state is represented by that portion of the graph of FIG. 2 to the right of point D.

If a malfunction in the pressure source terminates fluid communication to the inlet 28, the brakes of the vehicle may be applied manually. When this occurs, the end of the socket 90 engages the end of the member 80 to provide a mechanical link between the rods 88 and 66 through the piston 16.

We claim:

1. In a hydraulic boost device operated by a source of fluid pressure:

a housing defining a bore therewithin;

a piston slidable in said bore dividing the latter into a pair of chambers defined by opposite ends of the piston and corresponding ends of the bore;

valve means for communicating one of said chambers with said source of fluid pressure whereby said piston is driven into the other chamber;

operator-actuated means extending from the housing for operating said valve means;

the fluid pressure in said one chamber opposing movement of said operator-actuated means; and other means within said housing operated by movement of said piston for providing a force opposing movement of said operator-actuated means in addition to the force provided by the fluid pressure in the one chamber;

the force applied to said operator-actuated means by said other means being proportional to movement of the piston;

said other means including a deformable medium in the other chamber, said piston pressurizing said medium upon movement of the piston into the other chamber, and structure operably connected to said operator-actuated means for transmitting a proportional amount of said pressurization to said operator-actuated means;

said operator-actuated means including an elongated member slidably mounted in said bore;

said structure including a plunger slidably arranged in said bore between the ends of the piston and said medium for sensing pressurization of the latter, a transversely extending member engaging the end of said elongated member, and means interconnecting the plunger with the transversely extending member.

2. The invention of claim 1:

said interconnecting means including a plurality of force transmitting pins extending through said piston.

3. In a hydraulic boost device operated by a source of fluid pressure:

a housing defining a bore therewithin;

a piston slidable in said bore dividing the latter into a pair of chambers defined by opposite ends of the piston and corresponding ends of the bore;

valve means for communicating one of said chambers with said source of fluid pressure whereby said piston is driven into the other chamber;

operator-actuated means extending from the housing for operating said valve means;

the fluid pressure in said one chamber opposing movement of said operator-actuated means;

other means within said housing operated by movement of said piston for providing a force opposing movement of said operator-actuated means in addition to the force provided by the fluid pressure in the one chamber;

the force applied to said operator-actuated means by said other means being proportional to movement of the piston;

a compartment within said housing in fluid communication with said one chamber; and a plunger slidably arranged within said compartment and operably connected to said operator-actuated means for exerting a force on the latter proportional to the fluid pressure level in said one chamber.

4. The invention of claim 3:

a valve seat mounted within said housing; and a valve member on one end of said plunger cooperating with said valve seat to control fluid communication to said one chamber;

said operator-actuated means including an elongated member for forcing said valve member off of said seat when the operator-actuated means is operated by the vehicle operator;

the fluid pressure is said compartment acting against said plunger to exert a force on said elongated member through said valve member opposing movement of the elongated member.

5. The invention of claim 4:

said compartment, said valve member, and said valve seat being disposed within said piston;

said elongated member being slidably supported within said housing for movement toward and away from said valve member.

6. The invention of claim 4:

said other means including a deformable medium in the other chamber, said piston pressurizing said medium upon movement of the piston into the other chamber, and structure operably connected to said operator-actuated means for transmitting a proportional amount of said pressurization to said operator-actuated means.

7. The invention of claim 6:

said operator-actuated means including an elongated member, slidably mounted in said bore;

said structure including a plunger slidably arranged in said bore between the ends of the piston and said medium for sensing pressurization of the latter, a transversely extending member engaging the end of said elongated member, and means interconnecting the plunger with the transversely extending member.

* * * * *